United States Patent [19]

Csere et al.

[11] 4,437,340

[45] Mar. 20, 1984

[54] ADAPTIVE AIR FLOW METER OFFSET CONTROL

[75] Inventors: Csaba Csere, Ypsilanti; William C. Follmer, Livonia, both of Mich.

[73] Assignee: Ford Motor Company, Dearborn, Mich.

[21] Appl. No.: 324,287

[22] Filed: Nov. 23, 1981

[51] Int. Cl.³ .............................................. G01M 15/00

[52] U.S. Cl. ............................................ 73/118; 73/3; 123/440

[58] Field of Search ...................... 73/118, 3; 123/486, 123/480, 440

[56] References Cited

U.S. PATENT DOCUMENTS

| | | | |
|---|---|---|---|
| Re. 29,741 | 8/1978 | Norimatsu et al. | 364/431 |
| 3,893,432 | 7/1975 | Krupp et al. . | |
| 3,927,304 | 12/1975 | Wentworth et al. | 235/150.21 |
| 3,964,457 | 6/1976 | Coscia . | |
| 3,969,614 | 7/1976 | Moyer et al. | 235/150.21 |
| 4,040,394 | 8/1977 | Wahl et al. . | |
| 4,048,479 | 9/1977 | Rivere | 235/150.21 |
| 4,057,042 | 11/1977 | Aono . | |
| 4,112,879 | 9/1978 | Assenheimer et al. . | |
| 4,130,863 | 12/1978 | Schweitzer et al. | 364/105 |
| 4,138,979 | 2/1979 | Taplin . | |
| 4,140,086 | 2/1979 | Schnurle et al. . | |
| 4,150,645 | 4/1979 | Berent . | |
| 4,309,971 | 1/1982 | Chiesa et al. | 123/486 X |

*Primary Examiner*—Jerry W. Myracle

*Attorney, Agent, or Firm*—Peter Abolins; Robert D. Sanborn

[57] ABSTRACT

This invention adapts stored engine control parameters to variations in the air and fuel supply systems to improve open loop air fuel ratio control. An offset amount is calculated which is to be added to measured air flow in an internal combustion engine capable of operating in an open loop mode and a closed loop mode. In the method, an engine operating condition in a closed loop mode at idle is established. The current average fuel control signal is calculated. The current average fuel control signal is compared to a previous average open loop fuel control signal to obtain a difference average fuel control signal. An offset control signal is generated as a function of the difference average fuel control signal and is to be added to all future air flow measurements thereby providing for adaptive correction and more accurate air fuel ratio control in the open loop mode.

14 Claims, 5 Drawing Figures

FIG.1 PRIOR ART
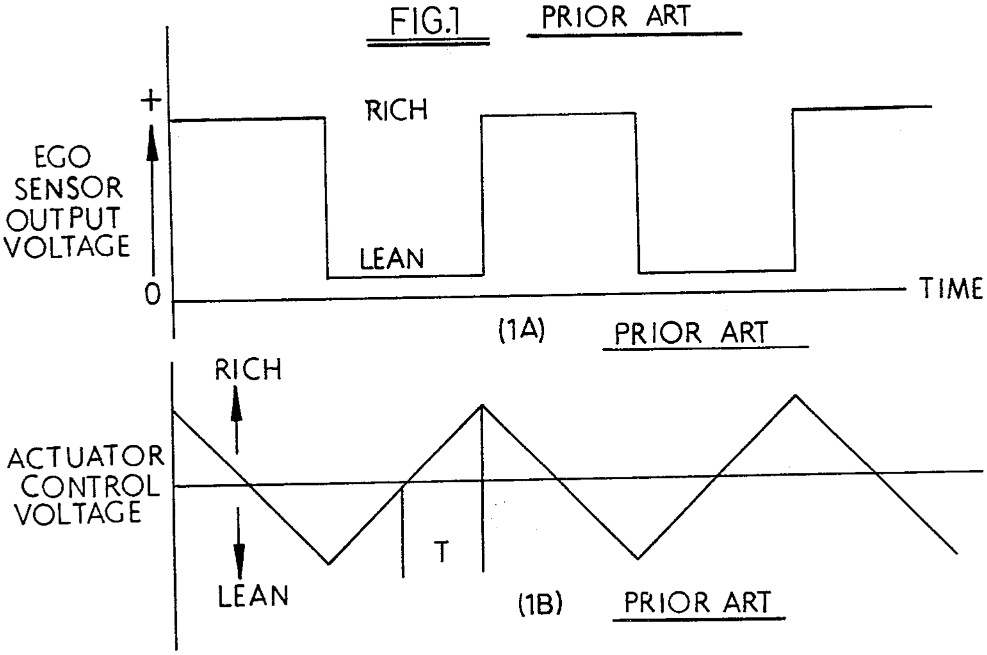
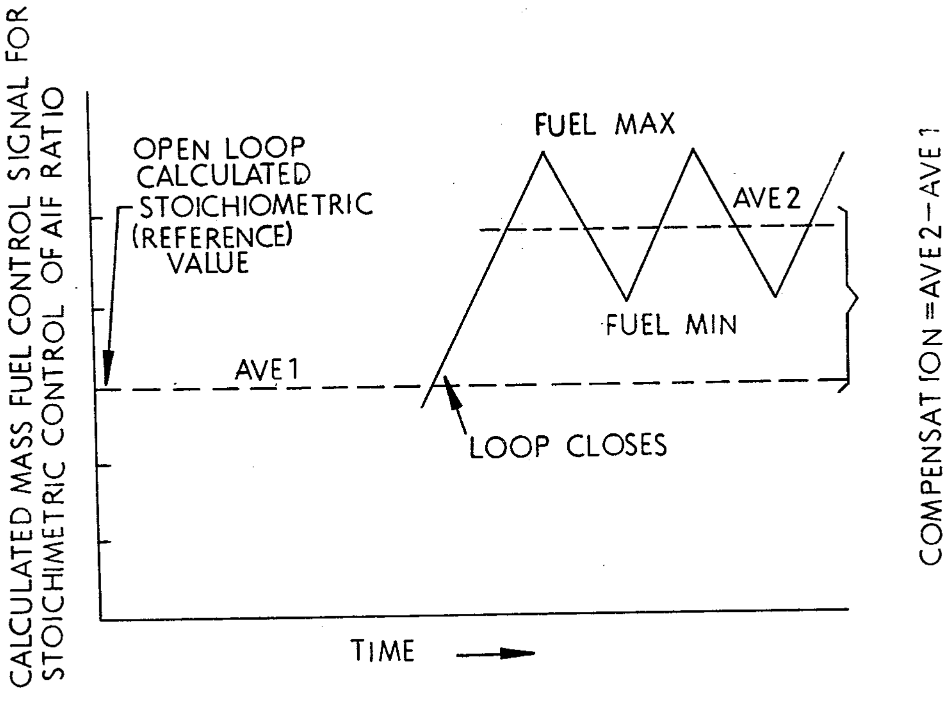
FIG.2

ADAPTIVE AIRFLOW ALGORITHM

1. "OFFSET" IS ADDED TO THE MEASURED AIRFLOW TO ADAPT FOR UNCALIBRATED AIR AND FUEL FLOW CHANGE
2. SEE FIG. 2
3. CALL REF FUEL=LAST CALLULATED OPEN LOOP FUEL FLOW VALUE AT IDLE

ADAPTIVE AIR FLOW METER OFFSET CONTROL

BACKGROUND OF THE INVENTION

1. Field of the Invention

This invention relates to engine fuel control systems which incorporate an air/fuel ratio feedback control.

2. Prior Art

Various fuel control systems are known in the prior art in which the quantity of fuel fed to the engine is controlled by sensors in the exhaust gas which give an indication of the air fuel ratio. Nevertheless, it remains extremely difficult to compensate for the ever changing operating conditions of the engine, the variations among different engines and so on as to always operate the engine with a predetermined air fuel ratio. This drawback may become critical when the engine is equipped with a catalytic converter for reducing undesirable components of the exhaust gases.

A widely used technique to control the air fuel ratio in stoichiometric feedback controlled fuel metering systems is limit cycle integral control. In this technique, there is a constant movement of a fuel metering component in a direction that always tends to counter the instantaneous air fuel ratio indication given by a typical two state exhaust gas oxygen (EGO) sensor. For example, every time an EGO sensor indicates a switch from a rich to a lean air fuel ratio mode of operation, the direction of motion of a typical carburetor's metering rod reverses to create a richer air fuel ratio condition until the sensor indicates a change from a lean to rich air fuel ratio condition. Then, the direction of motion of the metering rod is reversed again this time to achieve a leaner air fuel ratio condition.

Referring to FIGS. 1*a* and 1*b*, step like changes in the sensor output voltage initiate ramp like changes in the actuator control voltage. When using the limit cycle integral control, the desired air fuel ratio can only be attained on an average basis since the actual air fuel ratio is made to fluctuate in a controlled manner about the average value. The limit cycle integral control system can be characterized as a two state controller with the mode of operation being either rich or lean. The average deviation from the desired value is a strong function of a parameter called engine transport delay time, tau. This is defined as the time it takes for a change in air fuel ratio, implemented at the fuel metering mechanism, to be recognized at the EGO sensor, after the change has taken place.

The engine transport delay time is a function of the fuel metering system's design, engine speed, air flow, and EGO sensor characteristics. Because of this delay time, a control system using a limit cycle technique always varies the air fuel ratio about a mean value in a cyclical manner, a rich air fuel ratio time regime typically followed by a lean air fuel ratio time regime. The shorter the transport delay time is, the higher will be the frequency of rich to lean and lean to rich air fuel ratio fluctuation and the smaller will be the amplitudes of the air fuel ratio overshoots. It can be appreciated that a system with no engine transport delay time is the ideal.

In internal combustion engines having a catalytic converter, such as a platinum rhodium converter, it is often desirable to operate at stoichiometry in order to minimize emissions. At stoichiometry, the air fuel ratio is 14.64. In such a system the engine base fuel mass flow is calculated by measuring air mass flow and dividing by 14.64. Further, internal combustion engines having such air fuel ratio control are often capable of operating in both open and closed loop modes. In the closed loop mode, an exhaust gas oxygen sensor senses the air fuel ratio and corrects the base air fuel control signal. In the open loop mode, the air fuel ratio is established as a function of stored operating parameters in view of measured air flow. However, such stored operating parameters and measured air flow may not reflect engine wear and history. For example, it may be desirable to compensate engine open loop air fuel ratio control for effects caused by uncalibrated air leaks and fuel system aging. Typically, open loop operations occur when there is cold engine operation and wide open throttle engine operation. Under such conditions the EGO sensor response is not sufficient for adequate control. Fuel control is obtained normally by detecting the air mass entering the engine. Since the exhaust gas oxygen sensor is out of the control loop, this operation is referred to as being open loop. However, uncalibrated air leaks and fuel system aging can cause difficulty in achieving a desired air fuel ratio during open loop operation.

Further, initial installation and calibration of airmeters on vehicles has indicated that there is an additive or offset error between bench and vehicle calibrations at idle. This error can be of the order of 30%. since the estimated injector error at idle is approximately 5%, the probable cause of this error is air leakage into the engine downstream of the airmeter. This error is greatest at idle when airflow is at a minimum and manifold pressure is low. Air leakage of this nature has been a problem in airmeter controlled systems, usually requiring individual vehicle calibrations to eliminate the problem. This represents an undesirable complexity and expense. These are some of the problems this invention overcomes.

SUMMARY OF THE INVENTION

This invention recognizes that adapting stored engine control parameters to variations in the air and fuel supply systems can improve open loop air fuel ratio control. In closed loop operation, the average fuel delivery starts at the calculated open loop value and is modified by a calibration in accordance with an embodiment of this invention. That is, during closed loop operation, an average fuel flow control signal is calculated. This term is subtracted from the last calculated open loop fuel flow control signal to obtain a control signal difference. Advantageously, this control signal difference is multiplied by calibration constant, K, to form an offset which is added to all future air flow measurements.

Such a method for adaptively correcting air flow measurement has numerous advantages. Corrections provide for short and long term changes in the engine air leakage, compensation of fuel system aging, and for engine to engine variability. As a result, there is no need for individual end of line vehicle calibrations. There is a correction for short term changes in engine air leakage such as a loose oil dipstick. There is no need for individual calibration of airmeters for an idle mixture adjustment.

BRIEF DESCRIPTION OF THE DRAWINGS

FIG. 1*a* is a graphical representation of the EGO sensor voltage with respect to time in accordance with a prior art limit cycle controlled technique;

FIG. 1*b* is a graphical representation of the actuator control voltage with respect to time corresponding to the prior art sensor output voltage of FIG. 1*a;*

FIG. 2 is a graphical representation of the calculated mass fuel control signal versus time including a first average which acts as a reference value and a calculated second average calculated during closed loop operation mode and showing an offset for correction of the central value about which the limit cycle oscillates;

DETAILED DESCRIPTION OF THE INVENTION

In accordance with an embodiment of this invention, the engine is operated in a closed loop mode, the air fuel ratio is determined, the amount of air being supplied to the engine is determined and compared to an expected or previously determined amount before closed loop operation. The difference between the two air flow values is the amount of offset or correction desired in accordance with this adaptive control technique. Thus, this sort of adaptive air flow strategy can provide for correction of open loop operation so that short and long term changes in both air and fuel supply from the expected amounts are corrected. Specifically, as shown in FIG. 2, a first average fuel flow control signal (AVE 1) associated with a particular open loop air fuel ratio can be determined and then closed loop operation can provide for the establishment of a second fuel flow control signal (AVE 2) associated with the same air fuel ratio.

Figure 3:
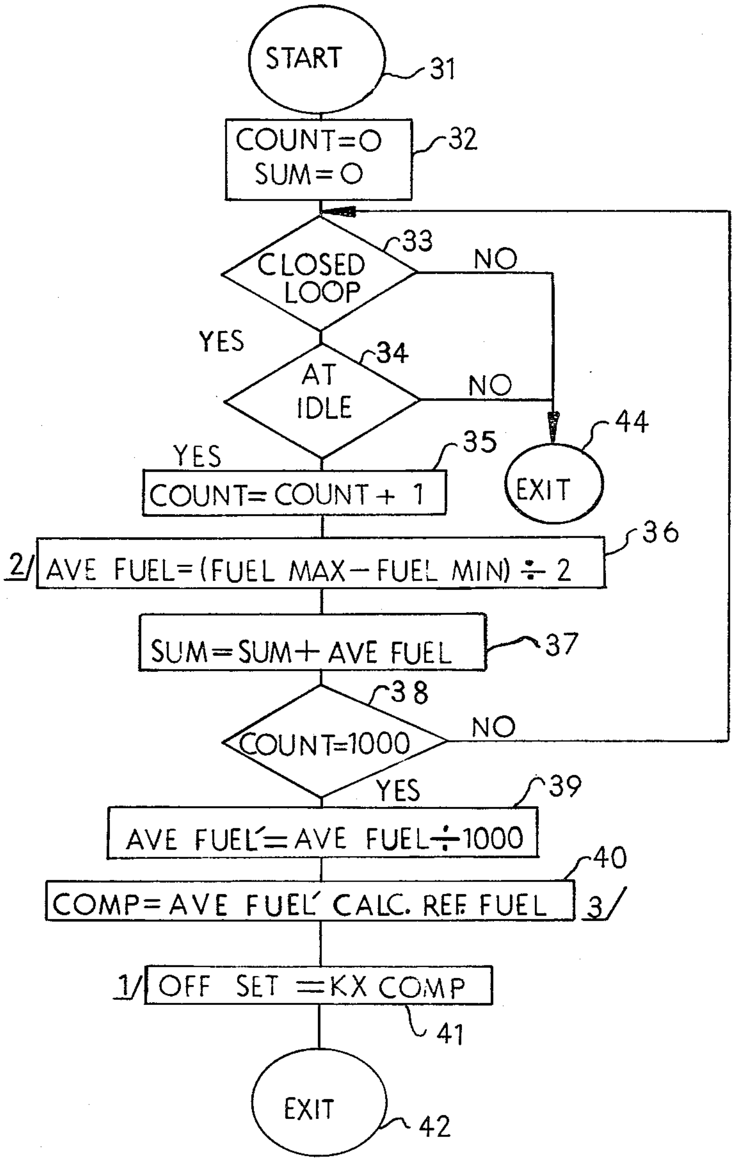
FIG. 3 is a block diagram of logic flow in accordance with an embodiment of this invention.

Referring to FIG. 3, a logic control flow chart for air flow offset calculation in accordance with an embodiment of this invention begins with a block 31 which starts the adaptive air flow calibration scheme. A status of iterations through the flow diagram is shown in block 32 using a count and sum description. An interrogation in block 33 is made to determine if the system is operating in a closed loop. If the system is not operating in a closed loop fashion, the control goes to an exit block 44 and no correction is computed. If closed loop operation is occurring, the logic operation goes to a block 34 which interrogates if the system is idle. If the system is not at idle, the logic operation goes to block 44 and exits from this calculation loop. If the system is operating at idle, the logic operation goes to a block 35 which increments the count by 1 indicating that another pass is being made through the logic operation. The logic operation goes from block 35 to block 36 where the average mass fuel control signal for stoichiometric control of air fuel ratio is calculated. The average fuel control signal is equal to the difference between the maximum fuel control signal and the minimum fuel control signal divided by 2.

Logic flow then goes to a block 37 wherein a "sum", initially a value from a previous calculation, is incremented by the amount of the calculated mass fuel control signal. The logic operation then goes to a block 38 wherein the decision is made whether a thousand counts of iterations through the flow chart, have been achieved. If not, the logic operation goes back to block 33. If yes, the logic operation goes to a block 39 wherein the average fuel is divided by one thousand to compensate for the thousand times that calculation is made. The number if iterations, such as one thousand, is chosen so that a relatively stable value of average fuel control signal is achieved. An averaging period of about 10 seconds has been determined to provide a stable base for corrections.

From block 39, the logic operation goes to a block 40 which determines the amount of compensation required by finding the difference between the average fuel computed in block 39 and a previously stored reference fuel control signal. That is, the calculated reference fuel control signal is equal to the last calculated open loop fuel flow value at idle and is typically stored in a non-volatile memory in the engine controls system. After computation of the compensation, the logic operation goes to a block 41 wherein the actual offset is determined by multiplication of a constant K times the compensation value calculated. The dimensions of the constant are such that computed fuel flow signal is converted to a corresponding air flow magnitude. From block 41, the logic operation goes to a block 42 wherein the adaptive air flow compensation calculation terminates.

Figure 4:
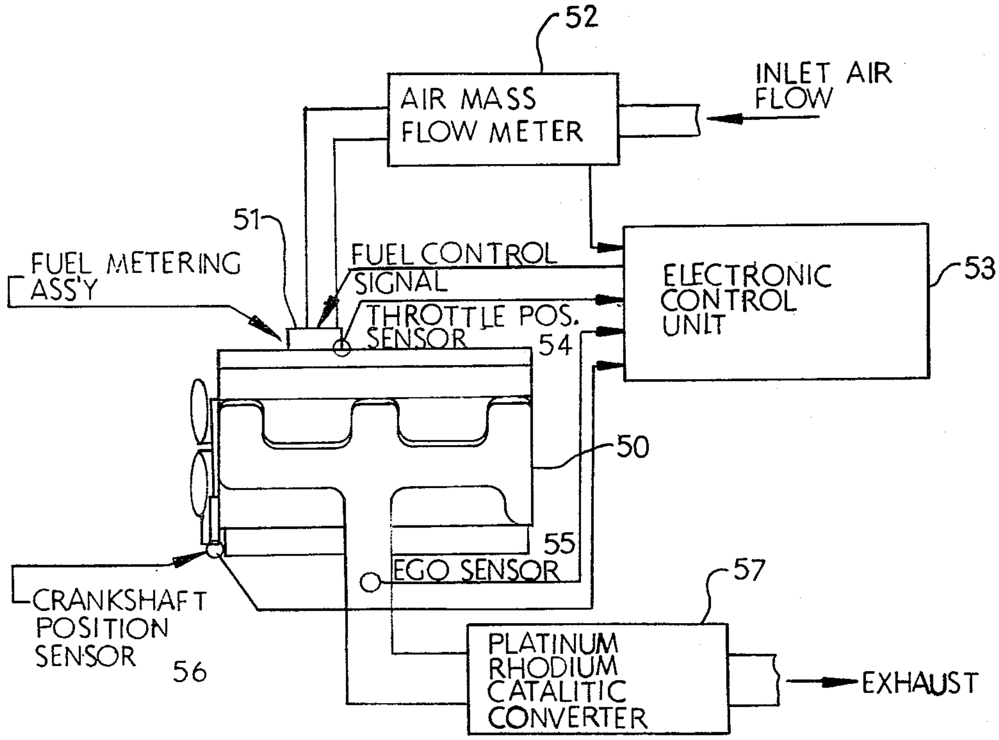
FIG. 4 is a partly schematic and partly block diagram of the connection of an engine fuel control system which incorporates an air flow meter offset.

Referring to FIG. 4, in accordance with an embodiment of this invention, an engine 50 has fuel metering assembly 51 for applying fuel to the engine in combination with air passing through an air mass flow meter 52. An electronic control unit 53 for controlling engine operation is coupled to air mass flow meter 52, a throttle position sensor 54, an exhaust gas oxygen sensor 55, and a crankshaft position sensor 56. Electronic control unit 53 processes these inputs and provides a fuel control signal applied to fuel metering assembly 51. After combustion of the air fuel mixture in engine 50, the exhaust gases are passed through a platinum rhodium catalytic converter 57. The desired air fuel ratio is implemented by fuel metering assembly 51 in response to an output provided by electronic control unit 53. Fuel metering system 51 can be an apparatus such as a carburetor or fuel injector. Crankshaft position sensor 56 is typically a magnetic or electrical sensor connected to the crankshaft for detection of rotational position. Exhaust gas oxygen sensor 55 produces an electrical voltage representative of the amount of oxygen in the exhaust gas thereby providing indication of whether the actual air fuel ratio entering engine 50 is rich or lean of stoichiometry. Electronic control unit 53 is described further in U.S. Pat. No. 3,969,614, the disclosure of which is hereby incorporated by reference. In accordance with an embodiment of this invention, if air is entering the air path downstream of air mass flow meter 52 into engine 50 then the fuel control signal from electronic control unit 53 can be adjusted to compensate.

Various modifications and variations will no doubt occur to those skilled in the art to which this invention pertains. For example, the particular number of samples or frequency of samples may be varied from that disclosed herein. These and all variations which basically rely on the teachings through which this disclosure has advanced the art are properly considered within the scope of this invention.

We claim:

1. A method for calibrating an air-fuel ratio control system for an internal combustion engine, including an air flow meter for measuring air flowing into said internal combustion engine and a stored look-up table for establishing engine control parameters in response to engine operating conditions such as air flow, said air fuel ratio control system further including a computer processing means for receiving an input from the air flow meter, for selecting the desired engine control parameters from the stored look-up table and for operating the engine in accordance with the selected engine control parameters, said method for calibrating including the steps of:

idling the internal combustion engine;

determining the magnitude of the air flow sensed by the air flow meter;

selecting engine control parameters in view of the magnitude of sensed air flow to establish a desired air fuel ratio;

determining the actual air fuel ratio;

generating a feedback correction signal to adjust the actual air fuel ratio to the desired air fuel ratio;

averaging the magnitude of the feedback correction signal during a period of time; and applying an offset signal proportional to the feedback correction signal as an adjustment to the sensed magnitude of the air flow thereby compensating the indicated air flow for air leakage causing the actual air fuel ratio to be displaced from the desired air fuel ratio as the engine operates in an open loop mode.

2. A method as recited in claim 1 wherein said step of averaging the magnitude of the feedback correction signal during a period of time involves averaging over about ten seconds.

3. A method as recited in claim 1 wherein said step of averaging the magnitude of feedback correction signal during a period of time involves repetitive generation of said feedback correction signal about at least 1000 times.

4. A method as recited in claim 1 wherein said step of applying an offset signal includes generating said offset signal by generating a signal proportional to the signal indicating the difference in fuel flow associated with the desired air fuel ratio and the actual air flow, the proportionality being equal to the ratio between an amount of air flow and an associated air fuel ratio.

5. A method for calibrating an air flow meter for an internal combustion engine capable of operating in a closed-loop mode and an open-loop mode comprising:

operating the internal combustion engine in a closed loop mode so as to achieve a desired air fuel ratio;

sensing the exhaust gas to determine the actual air fuel ratio;

determining any difference between the actual and desired air fuel ratio, the leakage of air downstream of the air flow meter being a function of said difference; and adjusting the fuel supply so that the air fuel ratio is adjusted toward the desired air fuel ratio thereby compensating for any leakage of air downstream of the airflow meter.

6. A method for calculating an offset air flow amount to be added to measured air flow in an internal combustion engine capable of operating in an open loop mode and a closed loop mode, said method comprising:

determining a predicted fuel control signal appropriate to establish a desired air fuel ratio in accordance with stored data;

establishing an engine operating condition in a closed loop mode at idle to maintain the desired air fuel ratio, the predicted fuel control signal being applied initially and then adjusted if necessary to maintain the desired air fuel ratio;

calculating a current average fuel control signal;

comparing the current average fuel control signal to the predicted fuel control signal to obtain a difference average fuel control signal;

calculating the offset air flow amount by determining the amount of air flow needed to produce the difference average fuel control signal using a proportionality constant multiplied by the average fuel control signal; and combining the offset air flow amount with all future air flow measurements thereby providing for adaptive correction and more accurate air fuel control when the engine operating condition is in the open loop mode.

7. A method as recited in claim 6 wherein said step of calculating a current average fuel control signal includes repetitive determinations of the actual fuel control signal over a period of time sufficiently long so that variations in the calculated average fuel control signal are reduced.

8. A method as recited in claim 6 wherein said step of calculating a current average fuel control signal includes combining maximum and minimum detected fuel control signals and dividing by two.

9. A method as recited in claim 8 further comprising computing a plurality of average fuel control signals, adding the average fuel control signals together and dividing by the number of average fuel control signals added together to obtain an extended average signal.

10. A method for calculating an offset amount to be added to measured air flow in an internal combustion engine capable of operating in an open loop mode and a closed loop mode, said method comprising:

establishing an engine operating condition in a closed loop mode at idle;

calculating a current average fuel control signal;

comparing the current average fuel control signal to a previous average open loop fuel control signal to obtain a difference average fuel control signal; and generating an offset control signal as a function of the difference average fuel control signal to add to all further air flow measurements thereby providing for adaptive correction and more accurate air fuel ratio control in the open loop mode.

11. A method for calculating an offset amount as recited in claim 10 wherein the step of calculating a current average fuel control signal includes:

determining the maximum fuel control signal during a predetermined loop time period;

determining the minimum fuel control signal during a predetermined loop time period;

adding together the maximum and minimum fuel control signals to obtain a combined fuel control signal;

dividing by two the combined fuel control signal to obtain a loop average fuel control signal;

repeating the above steps a predetermined number of times, each time adding the loop average fuel control signal to a sum; and dividing the sum by the predetermined number of times to obtain a current average fuel control signal.

12. A method for calculating an offset amount as recited in claim 11 wherein said predetermined number of times is about 1000.

13. A method for calculating an offset amount as recited in claim 11 wherein said predetermined number of times of repeating the steps takes about 10 seconds.

14. A method for calculating an offset amount as recited in claim 11 wherein the step of generating an offset fuel control signal includes multiplying the difference average fuel control signal by a constant having dimensions such that the difference average fuel control signal is converted to a corresponding air flow magnitude.

* * * * *